United States Patent
Ohno et al.

[11] Patent Number: 5,103,926
[45] Date of Patent: Apr. 14, 1992

[54] POWER STEERING APPARATUS WITH ELECTRIC MOTOR

[75] Inventors: Akihiro Ohno; Kazumasa Kodama, both of Okazaki; Yoshiharu Amano; Yukio Okamura, both of Toyota, all of Japan

[73] Assignee: Toyoda Koki Kabushiki Kaisha, Kariya, Japan

[21] Appl. No.: 598,201

[22] Filed: Oct. 16, 1990

[30] Foreign Application Priority Data

Oct. 16, 1989 [JP] Japan ................................ 1-269508
Oct. 16, 1989 [JP] Japan ................................ 1-269510

[51] Int. Cl.$^5$ ............................................. B62D 5/04
[52] U.S. Cl. .................................. 180/142; 180/79.1; 318/599
[58] Field of Search ................. 180/79.1, 142; 318/599

[56] References Cited

U.S. PATENT DOCUMENTS

| | | | |
|---|---|---|---|
| 4,567,413 | 1/1986 | Yabe et al. | 180/79.1 |
| 4,591,014 | 5/1986 | Yasuda | 180/79.1 |
| 4,771,845 | 9/1988 | Shimizu | 180/79.1 |
| 4,809,173 | 2/1989 | Fukami et al. | 180/79.1 |
| 4,878,004 | 10/1989 | Shimizu | 318/599 |
| 4,881,611 | 11/1989 | Nakashima et al. | 180/79.1 |
| 4,986,379 | 1/1991 | Morishita | 180/79.1 |

FOREIGN PATENT DOCUMENTS

| | | |
|---|---|---|
| 0249506 | 12/1987 | European Pat. Off. . |
| 0325148 | 7/1989 | European Pat. Off. . |
| 0358111 | 3/1990 | European Pat. Off. . |
| 2145678 | 4/1985 | United Kingdom . |
| 2204006 | 11/1988 | United Kingdom ............... 180/79.1 |

Primary Examiner—Charles A. Marmor
Assistant Examiner—Alan M. Kagen
Attorney, Agent, or Firm—Oblon, Spivak, McClelland, Maier & Neustadt

[57] ABSTRACT

A power steering apparatus wherein a heated state of the electric motor is detected without employing any temperature sensor. There are previously stored plural temperature characteristics each representing the relationship between the temperature variation caused per unit time in the electric motor and the load current, which are prepared, for plural motor temperatures or plural differences between the motor temperature and the ambient temperature. A temperature characteristic is selected on the basis of the present predicted motor temperature or the difference between the motor temperature and the ambient temperature. The present load current is detected, and the temperature variation caused per unit time correspondingly to such load current is calculated from the selected temperature characteristic. The unit-time temperature variations thus obtained are integrated with the lapse of time to predict the present motor temperature. Upon rise of the predicted motor temperature beyond a predetermined point, the electric motor is considered to be in a heated state.

8 Claims, 11 Drawing Sheets (MAP1)

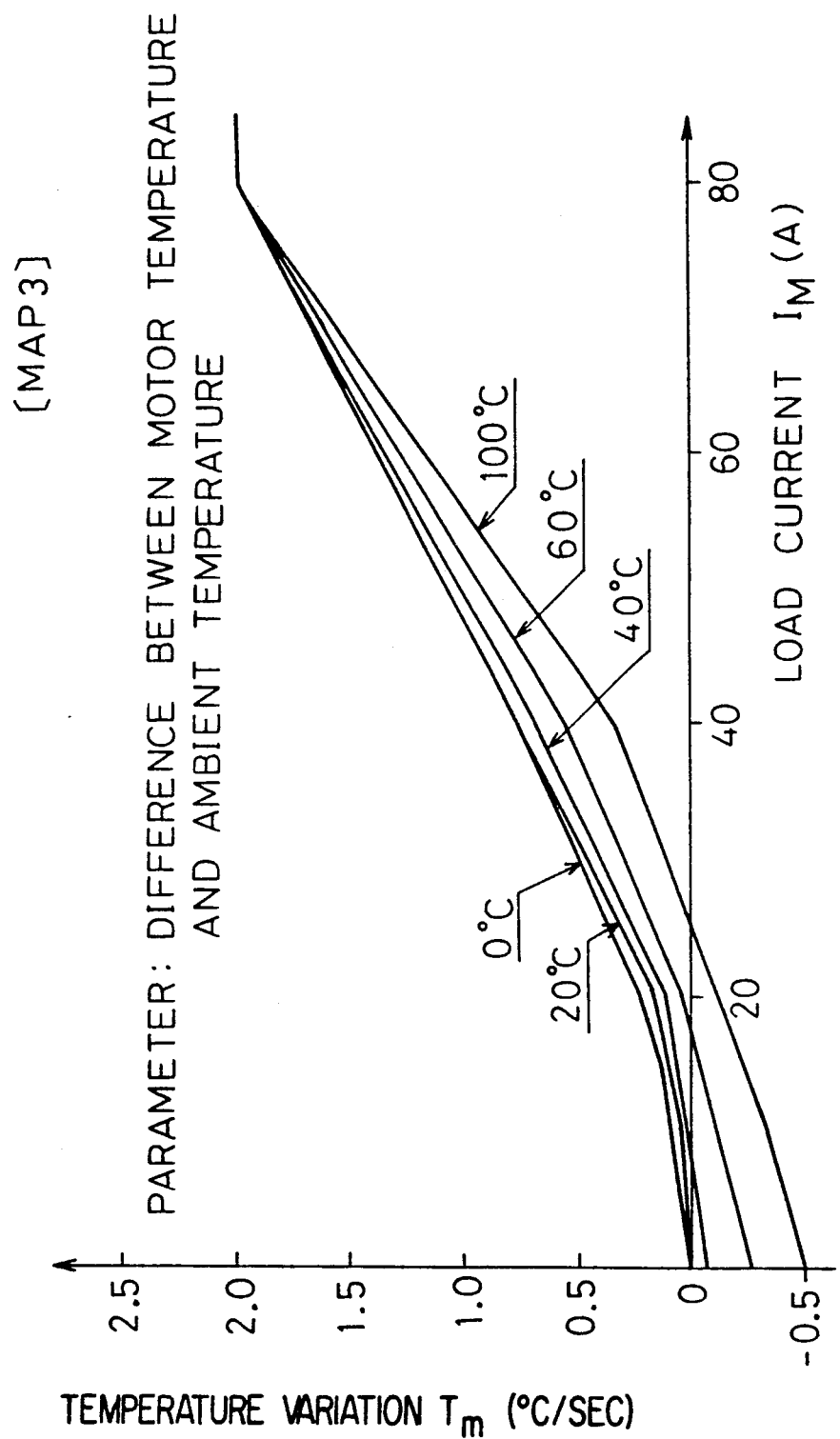
FIG. 12 [MAP 3]

POWER STEERING APPARATUS WITH ELECTRIC MOTOR

BACKGROUND OF THE INVENTION

1. Field of the Invention

The present invention relates to a power steering apparatus with an electric motor, inclusive of a type where a hydraulic assist force is generated from a pump driven by an electric motor, and a type where an assist force is generated directly by an electric motor.

2. Description of the Prior Art

In the hydraulic power steering apparatus known heretofore for use in automobiles, it is generally customary that a steering shaft and a pinion shaft are coupled to each other by means of a torsion bar. And in a steering operation, a torsion is induced in such bar to cause an angular phase difference between the steering shaft and the pinion shaft. In response to the angular phase difference so caused, the servo valve is actuated to control suction and exhaust of an actuating fluid for a power cylinder in such a manner as to generate an adequate assist force conforming with the angular phase difference. The servo valve functions to an assist force in proportion to a manual steering torque applied to the steering shaft, which causes the angular phase difference. In accordance with an increase of the angular phase difference, the assist force is rendered greater. In case the angular phase difference is decreased to the contrary, the assist force is rendered smaller. And supply of the actuating fluid to the servo valve is performed with the rotation of a pump driven by the motive power from an engine.

However, in any automobile where its engine is not installed in the front thereof (as in a midship car for example), the engine is considerably spaced apart from the steering shaft and so forth, and the use of a connecting pipe through the distance therebetween makes the structure complicated to eventually bring about some problems.

In view of such circumstances, there is contrived an improvement as disclosed in Japanese Patent laid-open No. 56 (1981)-99859, wherein an electric motor is disposed in the vicinity of a steering shaft, and a pump is rotated by the power from such motor to supply an actuating fluid.

In addition to the above, there is also known an electric power steering apparatus where a steering shaft or a pinion shaft is driven directly by means of an electric motor without utilizing any hydraulic action.

In each of such hydraulic and electric power steering apparatus, steering operations are performed frequently when an automobile is running at a low velocity or on any road with many curves such as a mountain road. Therefore, on any occasion requiring a high steering frequency, it follows that a load current comes to flow continuously in the electric motor, thereby inducing a possibility of overheating of the electric motor.

SUMMARY OF THE INVENTION

It is therefore a primary object of the present invention to avert overheating of an electric motor in a power steering apparatus.

Another object of the invention is to detect the temperature in an electric motor without using any temperature sensor employed customarily for direct detection of the motor temperature.

And a further object of the invention is to eliminate any fault that may be caused due to non-use of a temperature sensor.

In the present invention, a load current flowing in an electric motor is detected by a current detection means. The quantity of heat generated in the electric motor per unit time is proportional to the square of the load current, and the quantity of heat radiated per unit time from the electric motor to the ambience is proportional to the difference between the motor temperature and the ambient temperature. Meanwhile the temperature variation caused per unit time in the electric motor is proportional to the difference between the quantity of heat generated per unit time and the quantity of heat radiated per unit time. Accordingly, the quantity of heat generated per unit time in the electric motor at each time is determined by the load current, the motor temperature and the ambient temperature at that time. In the roughest approximation ignoring the factors relative to the motor temperature and ambient temperature, the temperature variation per unit time is determined by the load current. Meanwhile in a fine approximation under the assumed condition that the ambient temperature is maintained constant, the temperature variation caused per unit time in the electric motor is determined by the load current and the temperature in the electric motor at the present time.

The relationship between the temperature variation and the load current per unit time in the electric motor is previously stored in a temperature characteristic memory means.

The unit-time temperature variation in the electric motor corresponding to the present load current detected by the current detection means is calculated on the basis of the temperature characteristic stored in such memory means. In case plural temperature characteristics are stored for plural motor temperatures, one of the temperature characteristics corresponding to the predicted present temperature in the electric motor is selected as will be described later.

Furthermore, in case plural temperature characteristics are stored for plural motor temperatures and plural present ambient temperatures, one of the temperature characteristics corresponding to the present motor temperature and the present ambient temperature is detected.

The temperature variation per unit time thus calculated is integrated in accordance with the lapse of time to consequently predict the present temperature in the electric motor.

By a comparison between the predicted motor temperature and a predetermined temperature, there is generated a decision signal indicative of whether the electric motor is in a heated state or a cool state.

When such decision signal indicates the heated state of the electric motor, current supplied to the motor is limited or stopped.

Meanwhile, if the decision signal indicates that the electric motor is in its cool state, the motor is rendered rotatable.

BRIEF DESCRIPTION OF THE DRAWINGS

FIG. 12 is a characteristic diagram graphically showing the relationship between a load current $I_M$ and a temperature variation $T_m$ at each difference between the motor temperature and the ambient temperature in another embadiment.

DESCRIPTION OF THE PREFERRED EMBODIMENTS

Hereinafter exemplary embodiments of the present invention will be described with reference to the accompanying drawings.

Figure 1:
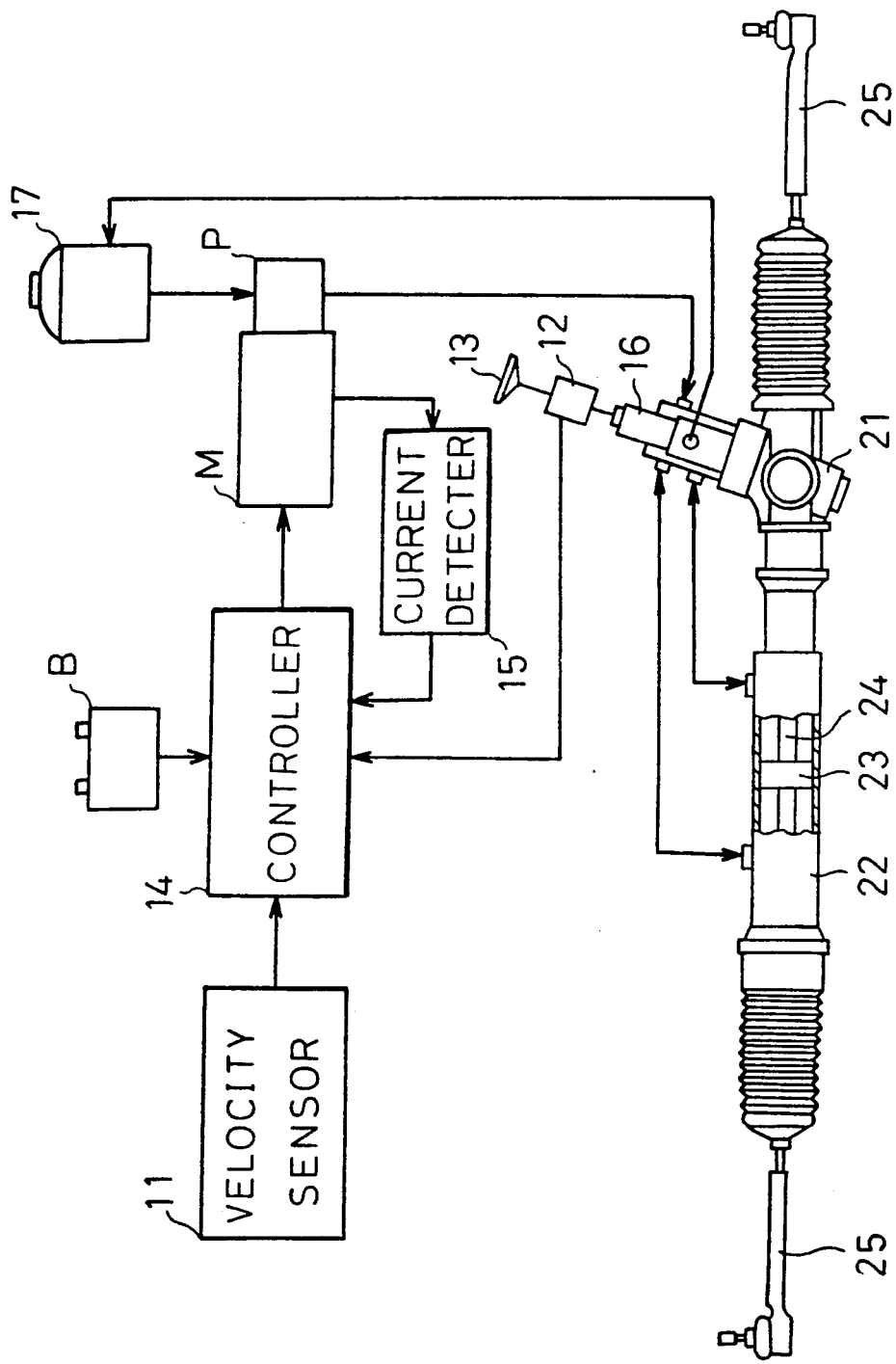
FIG. 1 shows the constitution of an exemplary embodiment of the pump-driven type power steering apparatus according to the present invention.

In FIG. 1, there are shown a velocity sensor 11 for detecting the velocity of an automobile, and a steering sensor 12 for detecting whether a steering wheel 13 is in operation or not.

Denoted by 14 is a controller which is supplied with an electric power from a battery B and receives output signals of both the velocity sensor 11 and the steering sensor 12.

Denoted by P is a pump rotated by an electric motor M. The pump P and the electric motor M are disposed integrally to constitute a motor-driven pump. An actuating fluid delivered from the pump P is supplied to a servo valve 16.

The load current flowing in the electric motor M is detected by a current detector 15 of a current detection means. And the output signal of the current detector 15 is inputted to the controller 14.

There are also shown a gear housing 21 consisting of a rack and a pinion gear, and a power cylinder 22 for generating an auxiliary steering force. Suction and exhaust of the actuating fluid for the power cylinder 22 are controlled by means of the servo valve 16. The power cylinder 22 drives a ball joint 25 via left and right steering rods 24 of a piston 23 to thereby steer an unshown front wheels.

Figure 2:
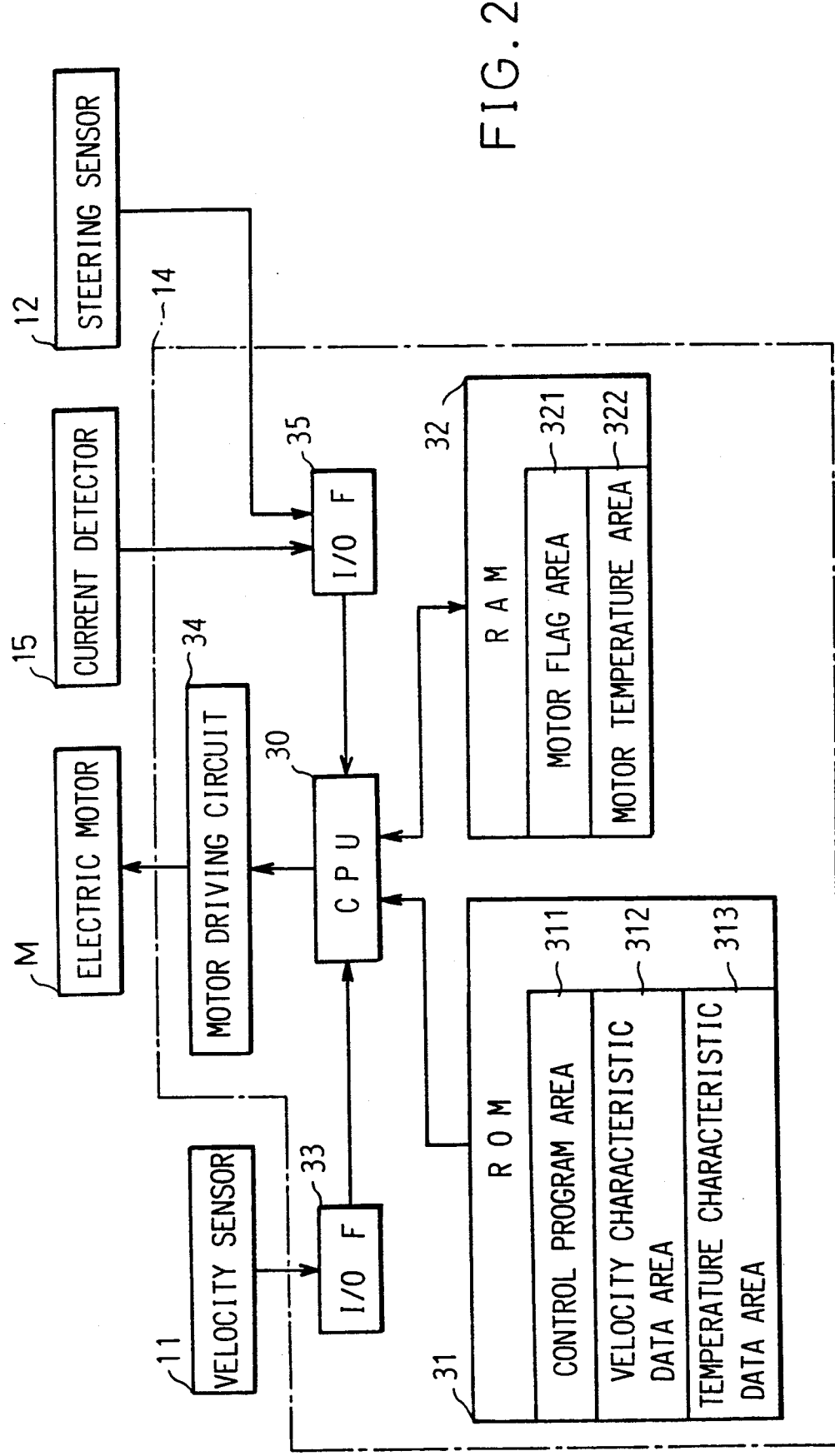
FIG. 2 is a block diagram of a controller employed in the embodiment of FIG. 1.

The controller 14 is composed of a computer system as shown in FIG. 2. A CPU 30 receives a velocity signal from the velocity sensor 11 via an input/output interface 33 and drives the electric motor M via a motor driving circuit 34. The CPU 30 further receives a load current signal and a steering signal from the current detector 15 and the steering sensor 12, respectively, via the input interface 35. To the CPU 30, there are connected a ROM 31 and a RAM 32. The ROM 31 has a control program area 311 to store an apparatus control program, a velocity characteristic data area 312 to store the velocity characteristics for changing the assist force in accordance with the automobile velocity, and a temperature characteristic data area 313 to store plural temperature characteristics for plural motor temperature each of which represents the relationship between the load current in the electric motor M and the temperature variation per unit time in the electric motor M. The RAM 32 serves for storing various data therein and has a motor flag area 321 and a motor temperature area 322.

Now the processing procedure of the controller 14 for calculating the voltage E to be applied to the electric motor M will be described below with reference to a flow chart of FIG. 3 and a characteristic diagram [Map 1] of FIG. 5 which graphically shows the relationship between the automobile velocity V and the voltage E.

First in step 100, a decision is made as to whether a flag MOTOR for controlling the electric motor M is 1 which signifies a normal control mode. In the initial control of the electric motor M, the flag MOTOR is set to 1 for placing the electric motor M in a normal control mode. Accordingly the result of the decision in step 100 becomes affirmative, so that the process proceeds to step 102.

In step 102, a decision is made as to whether the steering wheel 13 is in rotation or not, i.e., whether a steering signal is outputted or not from the steering sensor 12.

If the result of the decision in step 102 is affirmative to signify that a steering signal is obtained from the steering sensor 12, the process proceeds to step 104 where the automobile velocity V at that time is inputted from the velocity sensor 11.

Figure 5:
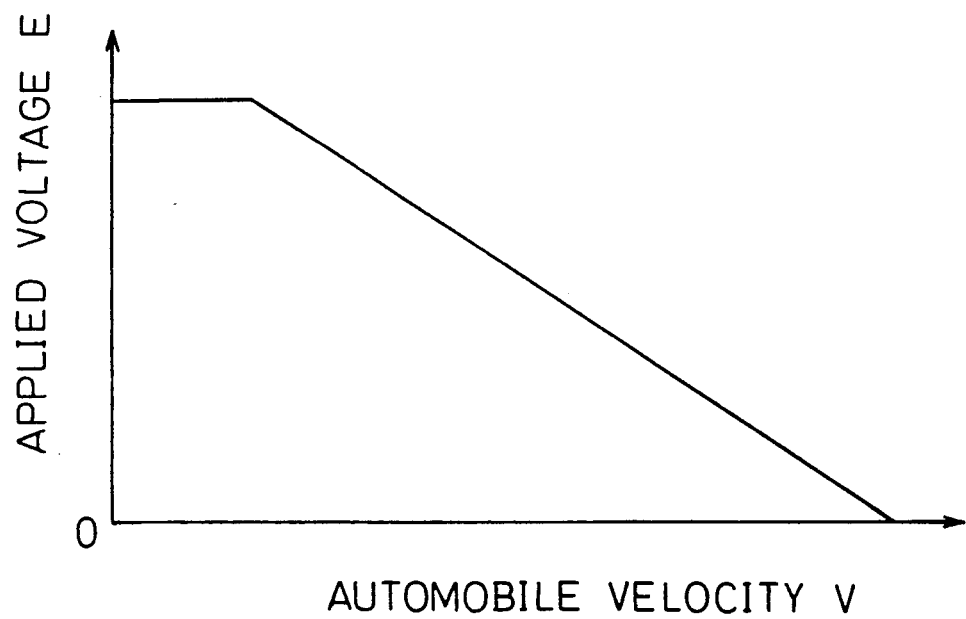
FIG. 5 is a characteristic diagram graphically showing the relationship between an automobile velocity V and a voltage E in the embodiment of FIG. 1.

Then the process proceeds to step 106 where the voltage E, which corresponds to the velocity V at that time and is to be applied to the electric motor M, is calculated from the velocity characteristics of FIG. 5 stored in the form of a map in the velocity characteristic data area 312 of the ROM 31.

Thereafter the process proceeds to step 108, where the motor driving circuit 34 is so controlled that the voltage E calculated in step 106 is applied to the electric motor M. The velocity characteristic of FIG. 5 is such that the applied voltage E is lowered in conformity with an increase of the velocity V. Due to such characteristic, in case the velocity V is high, the assist force is reduced under control even when the torsion of the steering shaft remains unchanged. In this manner, the control is so executed that the assist torque is increased in accordance with a reduction of the automobile velocity.

In the aforementioned step 100, when the flag MOTOR relative to control of the electric motor M is 0 which signifies that the motor M is not in the normal control mode, the process proceeds to step 110 where the voltage E to be applied is set to zero. Meanwhile, in case a steering signal is not outputted from the steering sensor 12 in step 102 to indicate that the operation is not in the steering state, the process proceeds to step 110 similarly to the above so that the voltage E to be applied is set to zero. Thereafter the process proceeds to the aforementioned step 108, that the control signal representing zero of the applied voltage E is outputted to the motor driving circuit 34, thereby bringing the electric motor M to a halt.

Hereinafter the processing procedure of the controller 14 for controlling the electric motor M in accordance with the motor temperature will be described with reference to FIGS. 6 and 7 on the basis of a flow chart of FIG. 4.

First in step 200, the load current $I_M$ flowing in the electric motor M is inputted from the current detector 15.

Figure 6:
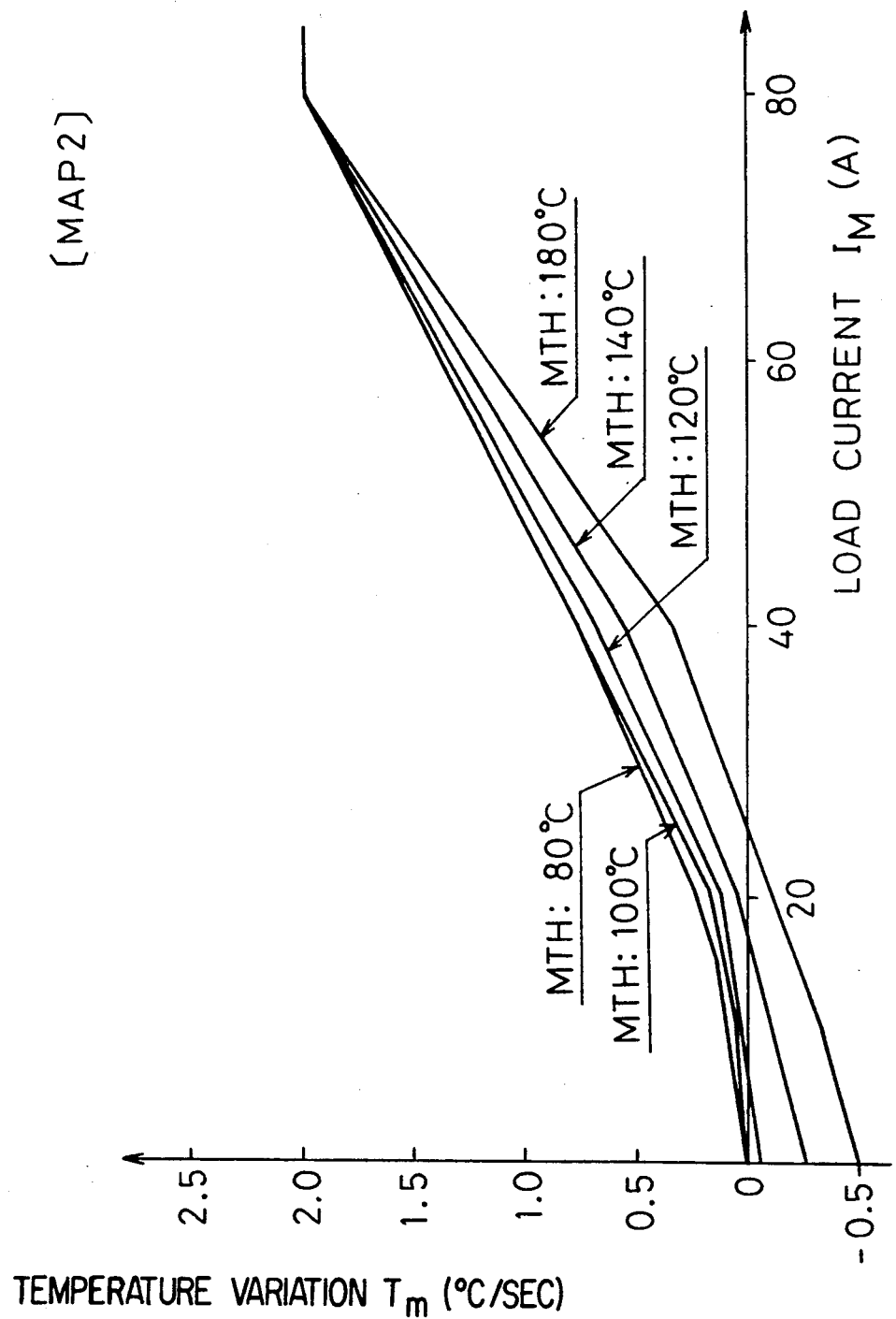
FIG. 6 is a characteristic diagram graphically showing the relationship between a load current $I_M$ and a temperature variation $T_m$ at each motor temperature MTH in the embodiment of FIG. 1.

Then the process proceeds to step 202, where the temperature variation $T_m$ per unit time corresponding to the detected load current $I_M$ and the motor temperature is calculated from the temperature characteristics of FIG. 6 stored in the temperature characteristic data area 313 of the ROM 31. The temperature characteristics are formed by aggregating a plurality of characteristics defining the relationships between the unit-time temperature variations and the load currents at plural prameter temperature, 80° C., 100° C., 120° C., 140° C. and 180° C. The temperature in the electric motor M is a predicted one as will be described later.

The initial value $T_0$ of the motor temperature is set to, e.g., 80° C. by taking into consideration a worst occasion where the ambient temperature around the electric motor M is the probable highest. And the temperature variation $T_m$ per unit time corresponding to the load current $I_M$ is calculated from the temperature characteristic curve for 80° C.

In case the motor temperature is not equal to one of the parameter temperatures, the characteristic corresponding to the motor temperature can be obtained by interpolating the two temperature characteristic curves.

The quantity of heat radiated per unit time from the electric motor M depends on the difference between the motor temperature and the ambient temperature at the present time. It is therefore supposed that, if the load current $I_M$ flowing in the electric motor M remains unchanged, the temperature variation $T_m$ per unit time is reduced in accordance with a rise of the motor temperature. As shown in the characteristic diagram [Map 2] of FIG. 6, each temperature characteristic curve is plotted with a safety factor included for exactly preventing damage to the electric motor M. More specifically, in any temperature curve where the present motor temperature is high, the temperature variation $T_m$ per unit time is increased in the graphic region where the load current $I_M$ is great. And each of the entire temperature characteristic curves gradually approach to the curve for, the lowest temperature 80° C., in accordance with approach of the load current $I_m$ to 80A.

Subsequently the process proceeds to step 204 where the present motor temperature MTH is calculated. The motor temperature MTH is obtained as an integral of the temperature variation $T_m$ per unit time. Namely, it is expressed as $$MTH = \int T_m \cdot dt \qquad (1)$$

Figure 4:
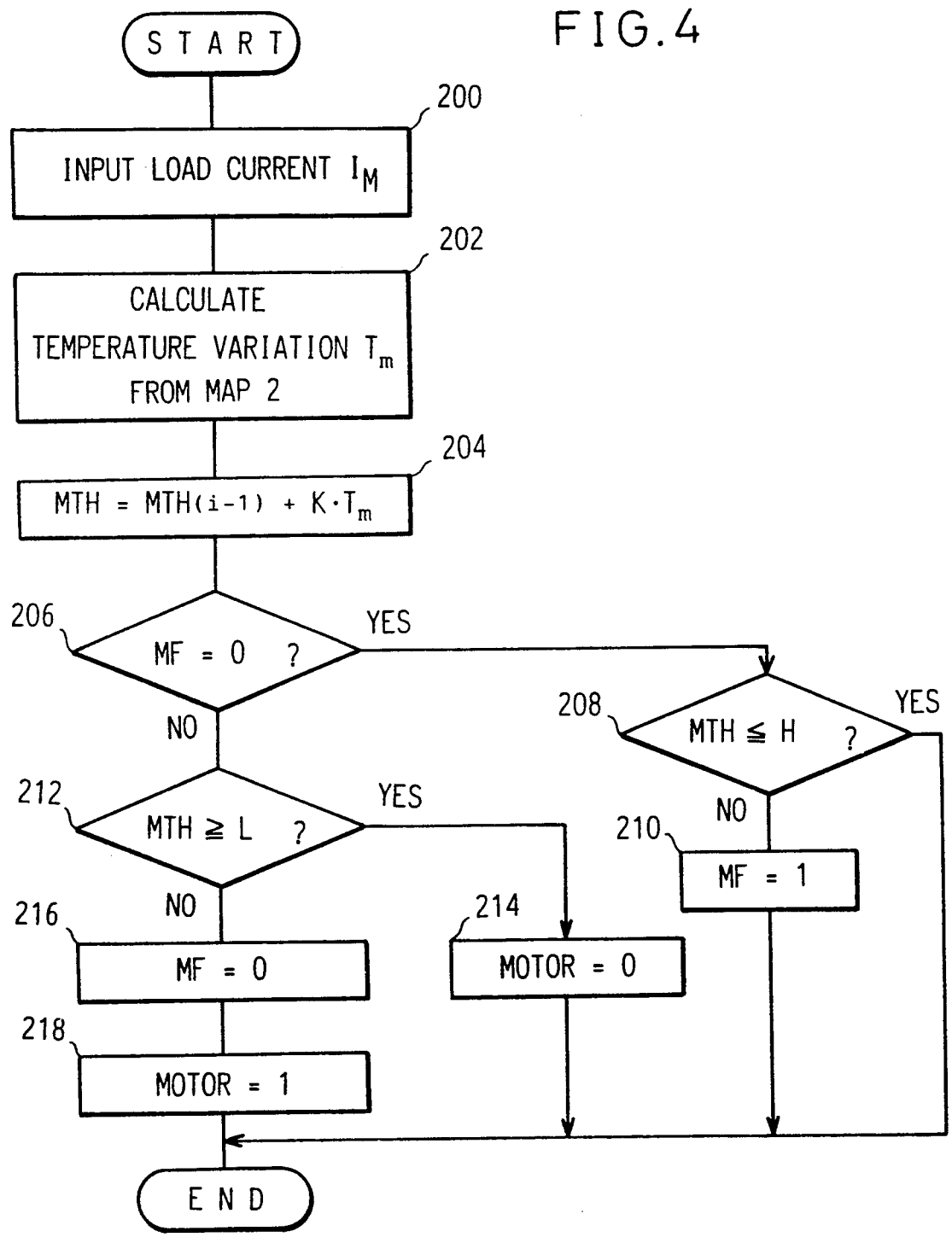

Since the program of FIG. 4 is executed repeatedly in a cycle of k seconds, Eq. (1) is calculated by summation as follows.

$$MTH = \sum_i T_m(i) \cdot k \qquad (2)$$

where i denotes the number of repetitions, and k·i denotes the time elapsed.

Practically the motor temperature MTH(i−1) obtained by the preceding calculation is stored, so that the present motor temperature MTH(i) can be obtained from the following equation.

$$MTH(i) = MTH(i-1) + k \cdot T_m(i) \qquad (3)$$

The number (i) is omitted when used for expressing the quantity at present time.

$$MTH = MTH(i-1) + k \cdot T_m \qquad (4)$$

Figure 7A:
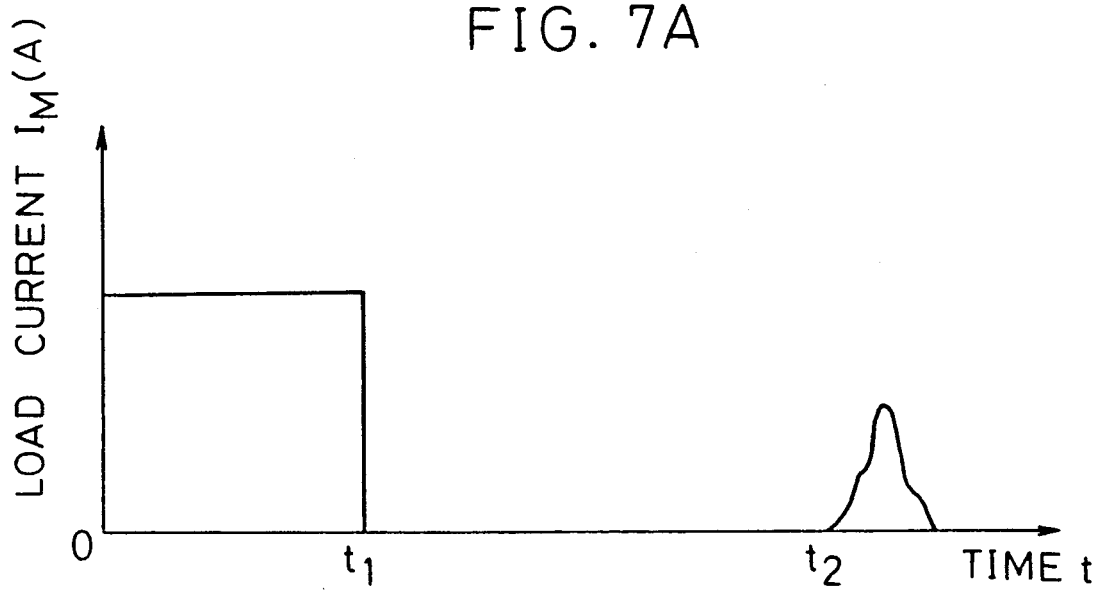
FIG. 7A is a timing chart showing variations of the load current $I_M$ in the embodiment of FIG. 1.
Figure 7B:
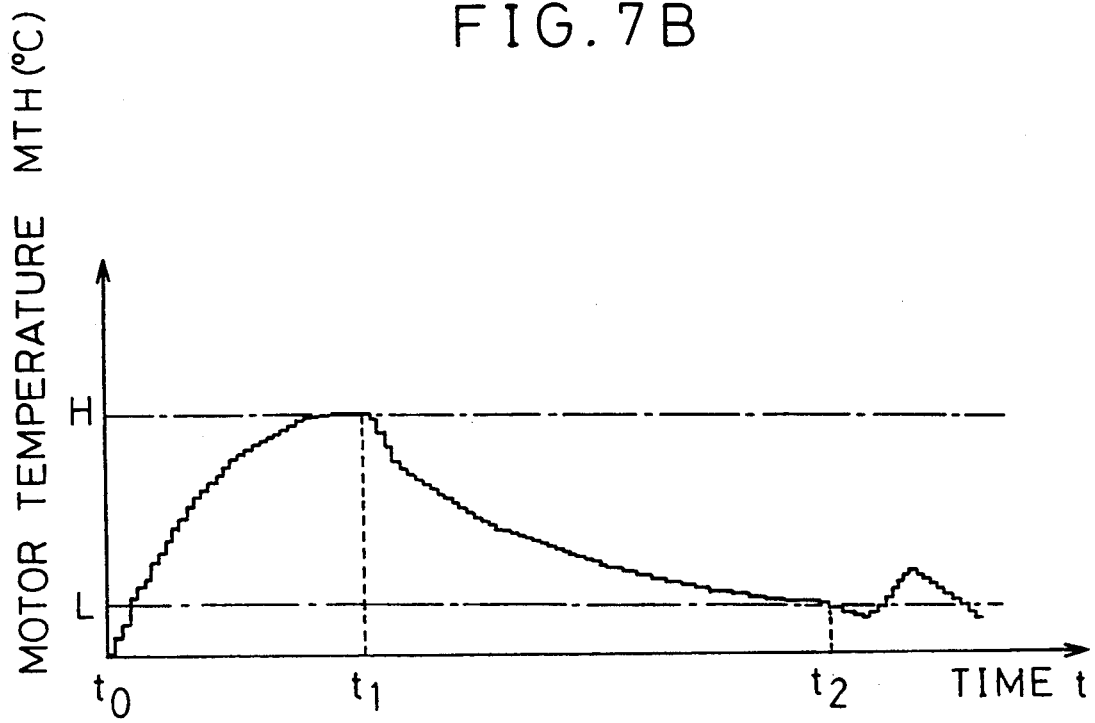
FIG. 7B is a timing chart showing variations of the motor temperature MTH caused in relation to the variations of the load current $I_M$ in FIG. 7A.

Assuming that the load current $I_M$ is so varied as shown in FIG. 7A in accordance with the lapse of time, the present motor temperature MTH is varied as shown in FIG. 7B.

In the graphic region up to the time t1 where the load current $I_M$ is great, the temperature variation $T_m$ per unit time always takes a positive value, as apparent from the characteristic curve shown in FIG. 6. And the temperature variation $T_m$ per unit time is reduced in accordance with a rise of the motor temperature MTH. Consequently the motor temperature MTH is always increased in the graphic region up to the time t1 when the load current $I_M$ is great, and the increase rate is diminished with a rise of the motor temperature MTH.

Meanwhile in the graphic region between the times t1 and t2 when the load current $I_M$ is zero, the temperature variation $T_m$ per unit time always takes a negative or zero value as apparent from the temperature characteristic curve shown in FIG. 6. And the absolute value of the temperature variation $T_m$ per unit time is increased in accordance with a rise of the motor temperature MTH. Consequently the motor temperature MTH is always decreased in the region between the times t1 and t2 when the load current $I_M$ is zero, and the decrease rate is diminished with a fall of the motor temperature MTH.

Meanwhile in the region posterior to the time t2 when the load current $I_M$ takes an intermediate value, the temperature variation $T_m$ per unit time takes a positive, zero or negative value depending on the motor temperature MTH and the load current $I_M$, as apparent from the temperature characteristic curve shown in FIG. 6. Consequently the motor temperature MTH is varied in accordance with the motor temperature MTH and the load current $I_M$ in the region posterior to the time t2 when the load current $I_M$ takes an intermediate value.

Thereafter the process proceeds to step 206, where a decision is made as to whether a flag MF indicating a normal state or an abnormal state of the electric motor M is zero (MF=0) or not. Since the flag MF is initially set to zero, the result of the decision in step 206 becomes affirmative, so that the process proceeds to step 208.

In step 208, a decision is made as to whether MTH≦H or not. More specifically, the present motor temperature MTH obtained by the integration in step 204 is compared with a preset upper limit temperature H (e.g. 180° C.) at which the electric motor M is kept free from damage.

And if the motor temperature MTH is not in excess of the upper limit temperature H, there exists no possibility of causing damage to the electric motor M. In this case, the result of the decision in step 208 becomes affirmative to thereby terminate one execution cycle.

Thus, when the electric motor M is in a normal state without being overheated, the process is executed by way of the steps 200, 202, 204, 206 and 208. Consequently the present motor temperature MTH is so predicted as shown in FIG. 7B with the lapse of time.

At the time (t1 in FIG. 7B) when the condition of the inequality MTH≦H is not satisfied in the aforementioned step 208, there exists a possibility of causing damage to the electric motor M due to overheating. Therefore the flag MF is set to 1 in step 210 for indicating an abnormal state, and the execution cycle is terminated.

In the execution cycle after setting the flag MF to 1, the result of the decision in step 206 becomes negative. Therefore the process proceeds to step 212 where a decision is made as to whether the condition of MTH≧L is satisfied or not. More specifically, the motor temperature MTH obtained by the integration in step 204 is compared with a preset lower limit temperature L (e.g. 100° C). The lower limit temperature L is a point where the heated electric motor M is sufficiently cooled and is considered to be ready for resuming rotation of the pump.

In the first execution cycle after setting the flag MF to 1, the result of the decision in step 212 naturally becomes affirmative, so that the process proceeds to step 214 where the flag MOTOR is changed to zero for placing the control of the electric motor M in an abnormal mode, and the present execution cycle is terminated.

Figure 3:
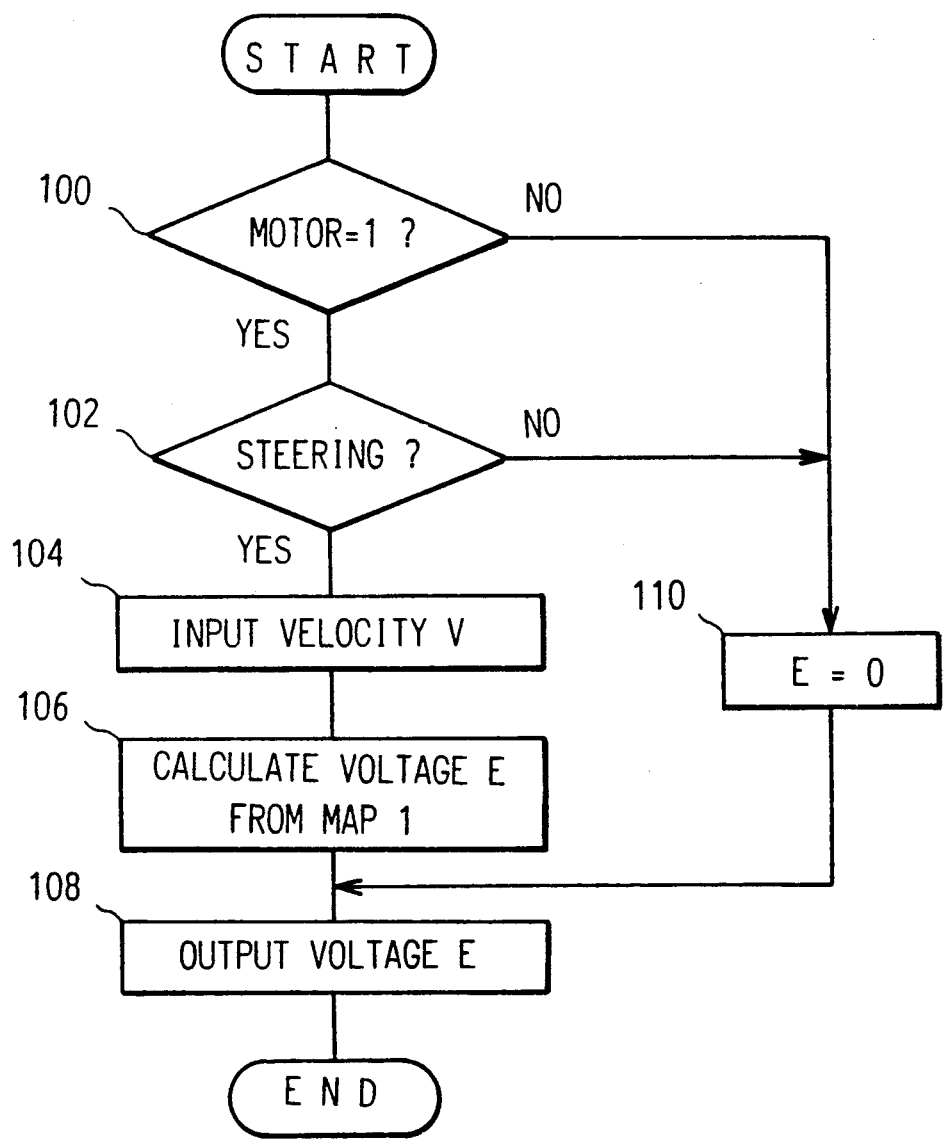
FIGS. 3 and 4 are flow charts showing the processing procedures executed by the controller in the embodiment of FIG. 1.

When the motor control is placed in the abnormal mode by the flag MOTOR, the result of the decision in step 100 becomes negative in the program of FIG. 3 for controlling the electric motor M. Consequently the applied voltage E is reduced to zero in step 110, whereby the electric motor M is brought to a halt for prevention of damage that may result from overheating.

Upon such halt of the electric motor M, the load current $I_M$ becomes zero. As apparent from the characteristic diagram of FIG. 6, the temperature variation $T_m$ per unit time at that time takes a negative value. Therefore the motor temperature MTH is gradually lowered (between the times t1 and t2 in FIG. 7B) by the temperature integration in step 204 of FIG. 4.

During the abnormal mode, the process is continuously executed by way of the steps 200, 202, 204, 206, 212 and 214.

When the electric motor M is thus cooled to lower the motor temperature MTH below the level L (at the time t2 in FIGS. 7A and 7B), the result of the decision in step 212 is turned to be negative, so that the process in step 216 is executed.

In step 216, the flag MF for the electric motor M is turned back to 0 representing the normal state, and then the process proceeds to step 218 where the flag MOTOR relative to control of the electric motor M is set to 1 which represents the normal control mode.

Consequently the result of the decision in step 100 in the program of FIG. 3 for controlling the electric motor M becomes affirmative to thereby execute voltage control in the normal control mode in the steps posterior to 100.

In the above embodiment, the temperature characteristics memory means is composed of the temperature characteristic data area 313 of the ROM 31 in the controller 14. The temperature variation rate detection means is composed of the step 202, and the temperature prediction means is composed of the step 204. Furthermore, the temperature decision means is composed of the steps 204 and 212, and the motor control means is composed of the steps 214, 218 and the program of FIG. 3.

Now a description will be given on a pump-driven type power steering apparatus according to another embodiment of the present invention.

This embodiment is so contrived as to ensure exact initial setting of the motor temperature MTH to thereby minimize the prediction error with respect to the motor temperature MTH.

Figure 8:
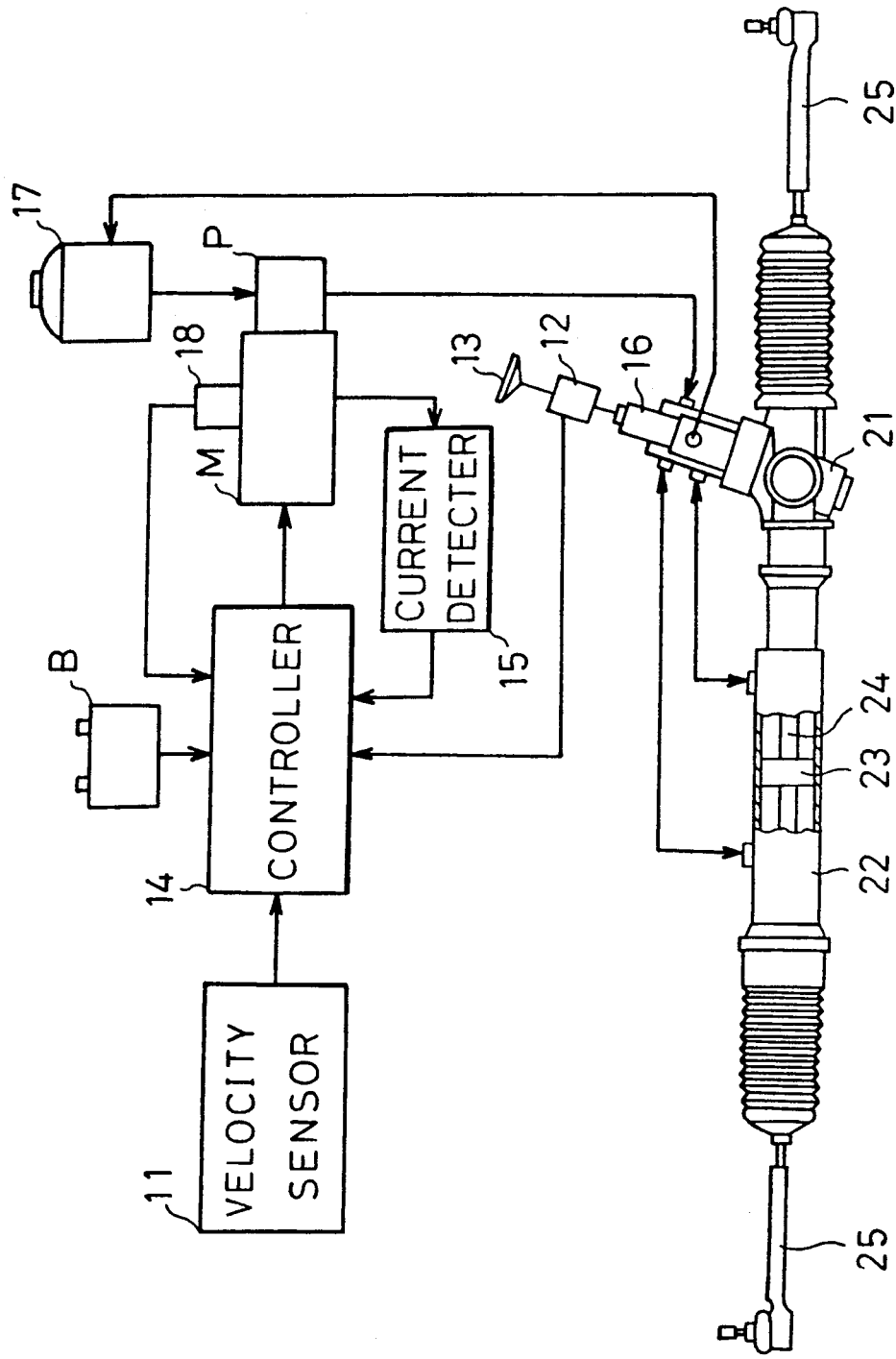
FIG. 8 shows the constitution of another exemplary embodiment of the pump-driven type power steering apparatus according to the present invention.
Figure 10:
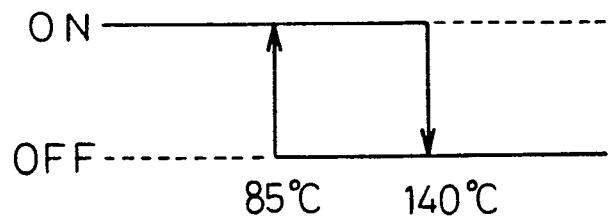
FIG. 10 shows the operating characteristics of a bimetal switch with respect to temperatures.

In FIG. 8, a bimetal switch 18 is disposed in an outer housing of an electric motor M. The on-off action of the bimetal switch 18 has such hysteresis characteristic as shown in FIG. 10. More specifically, the bimetal switch 18 is in its on-state in a low temperature region and is turned off when the temperature rises beyond 140° C. To the contrary, when the electric motor M at any temperature higher than 140° C. is cooled to be below 85° C. the bimetal switch 18 is turned back to its on-state A temperature 140° C. for changing the bimetal switch 18 from the on-state to the off-state is lower than a temperature 180° C. for halting the electric motor M; and a temperature 85° C. for changing the bimetal switch 18 from the off-state to the on-state is lower than a temperature 100° C. for returning the electric motor M to its rotatable state. The temperature in the bimetal switch 18 is equal to the temperature at the surface of the outer housing of the electric motor M and is lower than the predicted internal motor temperature MTH. Therefore, the temperature characteristic is so determined that the actual outer temperature reaches 140° C. when the predicted motor temperature MTH slightly exceeds the upper limit value H (180° C.), Furthermore, the temperature characteristic is determined in such a manner that, before the predicted motor temperature MTH falls below the lower limit value L (100° C.) the actual temperature at the outer housing of the electric motor M is lowered below 85° C. at which the bimetal switch 18 is turned on from the off-state.

Figure 9:
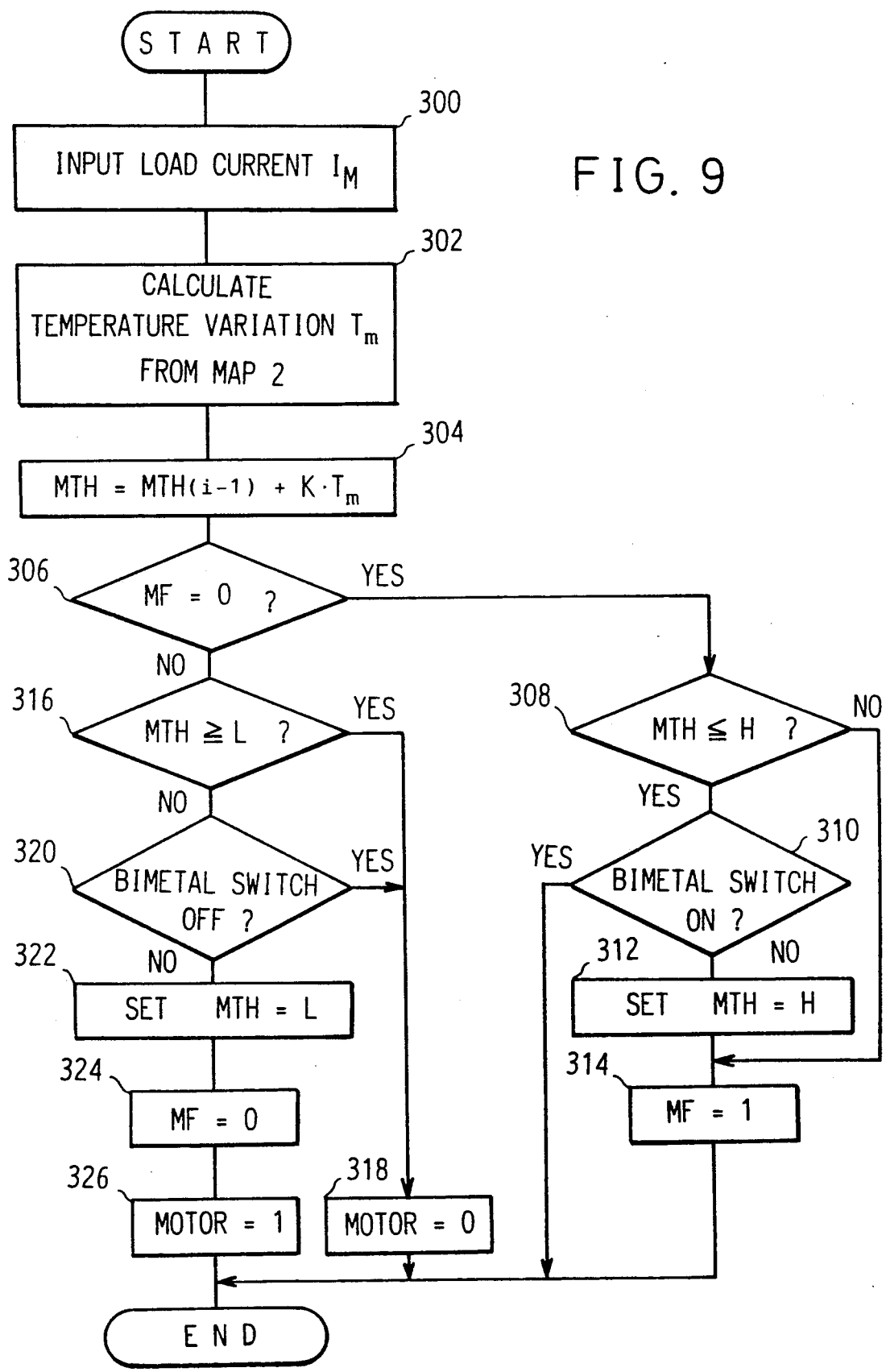
FIG. 9 is a flow chart showing the processing procedure executed by a controller employed in the embodiment of FIG. 8.

In FIG. 9 showing the processing procedure of the controller 14 in this embodiment, steps 300 through 308 are executed similarly to the aforementioned corresponding steps 200 through 208 of FIG. 4 in the foregoing embodiment. If the motor temperature MTH is not above the upper limit value H (e.g. 180° C.) to signify that the electric motor M is below the temperature of causing damage or the like, the condition of the inequality in step 308 is satisfied. In this case, a decision is made in step 310 as to whether the bimetal switch 18 is in its on-state or not. If the bimetal switch 18 is determined to be in the on-state, the result of the decision in step 310 becomes affirmative to thereby terminate the present execution cycle.

The processing procedure by way of the steps 300-306, 308 and 310 is executed repeatedly in the normal control mode where the electric motor M is not overheated.

The bimetal switch 18 is turned off upon rise of the outer temperature of the electric motor M beyond 140° C. Then the result of the decision in step 310 becomes negative so that the process proceeds to step 312, where the temperature setting is executed as MTH=H. Namely, the motor temperature MTH is set to the upper limit value H (180° C.) which represents the heated state of the electric motor M (corresponding to the jump of the MTH at the time t1 in FIG. 11).

The reason for such temperature setting will now be described below.

In the predictive calculation of the motor temperature, when the power supply for the controller 14 is switched on after being once switched off (a state where the automobile starting key is pulled out), the electric motor M is initialized to the ambient temperature 80° C. regardless of the actual motor temperature. Therefore, if the automobile is driven again prior to the lapse of a sufficient cooling time after the electric motor M is heated in the preceding drive, then the predicted motor temperature MTH comes to be lower than the actual temperature during the initial drive of the automobile. Consequently, even if the electric motor M is practically in its heated state, such is regarded as a non-heated state to eventually cause a possibility of burning the electric motor M.

However, when the bimetal switch 18 is in the off-state, the motor temperature MTH is initialized to its upper limit value H (180° C.) whereby the actual motor temperature is prevented from exceeding the upper limit value H.

The motor temperature MTH is lowered posterior to such correction of the predicted motor temperature MTH performed as mentioned, and thereafter the motor temperature MTH is raised again. The apparatus is so designed that the predicted motor temperature MTH exceeds the upper limit value H (180° C.) before the outer temperature of the electric motor M exceeds the temperature (140° C.) at which the bimetal switch 18 is turned off from its on-state. Accordingly, in the normal operation where the above correction is not necessary, the result of the decision in step 308 becomes affirmative to eliminate a condition that the bimetal switch 18 is turned off in step 310, and therefore the motor temperature MTH is never set again to the upper limit value H in step 312.

Subsequently the process proceeds to step 314 where the flag MF indicating the normal or abnormal state of the electric motor M is set to 1 which represents the abnormal state, and the present execution cycle is thus terminated. In a subsequent execution cycle after the flag MF is set to 1, the result of the decision in step 306 becomes negative, so that step 316 is executed successively. In this step, a decision is made as to whether MTH≧L or not. More specifically, the motor temperature MTH obtained by the integration in step 304 is compared with the preset lower limit temperature L (e.g. 100° C.). The lower limit temperature L is a point at which the overheated electric motor M has been sufficiently cooled and is considered to be ready for resuming rotation of the pump. In the first execution cycle posterior to setting the flag MF to 1, the result of the decision in step 316 naturally becomes affirmative, so that step 318 is executed. In this step, the flag MOTOR relative to control of the electric motor M is set to zero which signifies a halt of the motor, whereby an abnormal mode is selected and therefore no current is supplied to the electric motor M.

Upon such halt of the electric motor M, the load current $I_M$ becomes zero and the temperature variation $T_m$ at that time comes to take a negative value as apparent from the characteristic diagram of FIG. 6 [Map 2]. Accordingly the motor temperature MTH calculated in step 304 in the subsequent execution cycle is gradually lowered (between the times t1 and t2 in FIG. 11) in proportion to the temperature variation $T_m$ per unit time.

Figure 11:
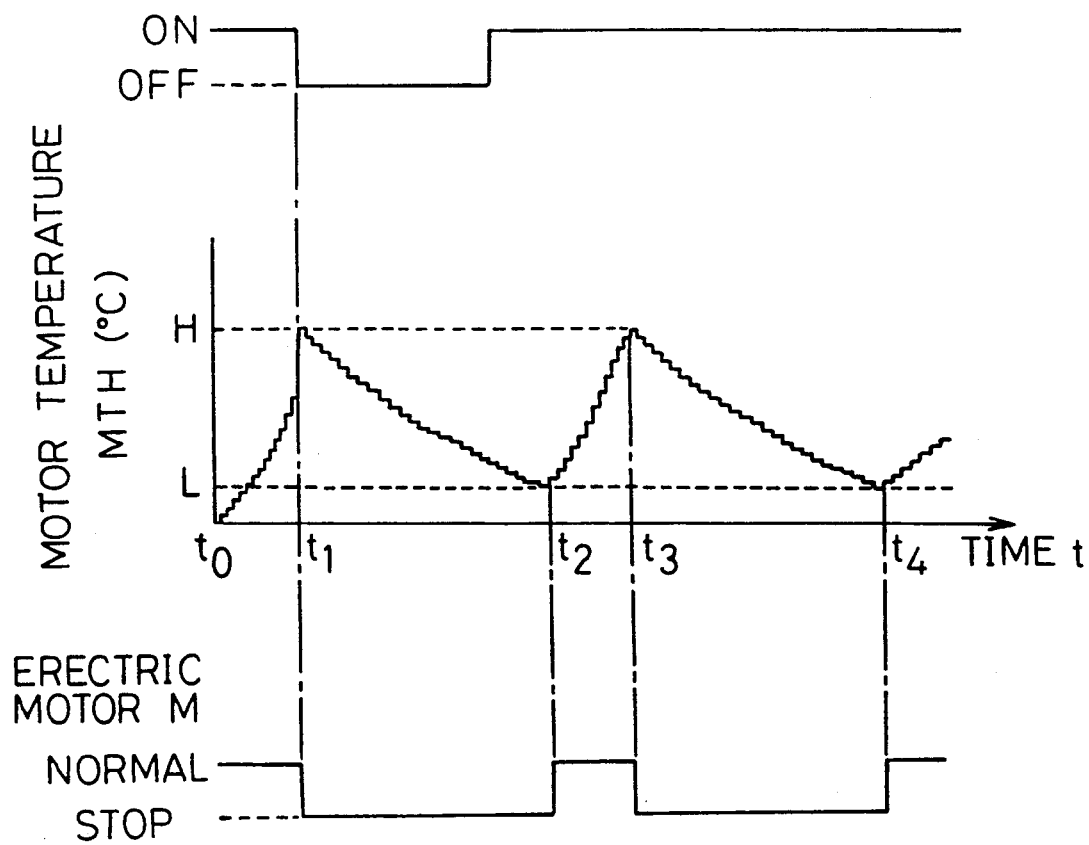
FIG. 11 is a timing chart showing variations in the motor temperature MTH and the controlled state of an electric motor M corresponding to the on/off state of the bimetal switch.

Then the condition of the inequality MTH≧L in step 316 is no longer satisfied (at the time t2 in FIG. 11). Therefore the process proceeds to step 320 where a decision is made as to whether the bimetal switch 18 is in its off-state or not. During the period in which the bimetal switch 18 is kept in the off-state, the result of the decision in step 320 is affirmative, so that the process proceeds to the aforementioned step 318 and similarly the electric motor M is maintained at a halt.

Subsequently when the bimetal switch 18 is turned on, the result of the decision in step 320 becomes negative, so that the process proceeds to step 322 where the motor temperature MTH is set to L. Namely, upon change of the bimetal switch 18 to its on-state, the motor temperature MTH is set again to the aforementioned lower limit temperature L (100° C.).

In a normal case where the temperature prediction is proper, the motor temperature MTH is so calculated as to reach the lower limit temperature L after the bimetal switch 18 is turned on from its off-state, as graphically shown in FIG. 11. Accordingly, step 322 is executed at the timing when the motor temperature MTH has fallen below the lower limit value L, whereby the motor temperature MTH is set again to the lower limit value L (100° C.).

However, there occurs an occasion where the predicted motor temperature MTH is lower than the actual temperature due to an erroneous deviation of the prediction. In such a case, there exists a possibility that the electric motor M is energized again before being completely cooled and consequently the actual motor temperature is prone to reach the upper limit temperature H readily. For the purpose of preventing such a fault, even when the predicted motor temperature MTH comes to be below the lower limit value L, the electric motor M is not energized unless the bimetal switch 18 is turned on. More specifically, steps 320 and 322 are executed at the timing when the bimetal switch 18 is turned on (i.e, when the outer temperature reaches 85° C.). The motor temperature MTH is set again to the lower limit value (100° C.) in step 322, and then the flag MF for selecting the normal control mode is set to 0 in step 324. Subsequently the flag MOTOR is set to 1 in step 326 for placing the electric motor M in an energizable state.

Thus, in this embodiment, the predicted motor temperature is corrected in conformity with the on/off state of the bimetal switch 18, hence averting any extension of the temperature prediction error. Particularly it is effective to prevent any prediction error relative to the motor temperature in the restart of the automobile. Therefore it becomes possible to eliminate the necessity of continuous prediction of the motor temperature when the automobile is parked.

In the two exemplary embodiments mentioned above, one of the temperature characteristics is selected by using the predicted present motor temperature MTH, and the temperature variation per unit time is calculated on the basis of the load current using the selected temperature characteristic. However, when it is necessary to perform a more accurate prediction of the motor temperature, as shown FIG. 12 the temperature characteristic can be set by using, as a parameter, the difference between the motor temperature and the ambient temperature. And after measuring the ambient temperature, the temperature variation per unit time may be calculated from the characteristic curve which is selected from the curves shown in FIG. 12 on the basis of the load current and the difference between the motor temperature and the ambient temperature. To the contrary, when the motor temperature is calculated by a rough approximation, it is possible to calculate the motor temperature variation per unit time merely from the load current alone.

This invention can be applied to another type of power steering system wherein an assist force is generated directly by an electric motor which is drivingly connected to the steering mechanism.

What is claimed is:

1. A power steering apparatus with an electric motor for an automobile, comprising:
   current detection means for detecting a load current flowing in said electric motor;
   temperature characteristic memory means for storing temperature characteristics each representative of the relationship between the load current flowing in said electric motor and a temperature variation caused per unit time in said electric motor by such load current;
   temperature variation rate detection means for calculating the motor temperature variation caused per unit time in said electric motor correspondingly to the load current detected by said current detection means, from the temperature characteristics stored in said temperature characteristic memory means;
   temperature prediction means for predicting a present motor temperature by integrating past motor temperature variations per unit time obtained by said temperature variation rate detection means;
   temperature decision means for comparing the present motor temperature obtained by said temperature prediction means with a predetermined set temperature to output a decision signal indicative of a heated state or a cool state of said electric motor; and
   motor control means for controlling said electric motor in accordance with the decision signal outputted from said temperature decision means.

2. A power steering apparatus according to claim 1, further comprising:
   thermal switch means retained in contact with an outer housing of said electric motor and having hysteresis characteristic to temperature with a capability of outputting binary signals representative of a high temperature state and a low temperature state; and
   temperature correction means for correctively resetting the present motor temperature predicted by said temperature prediction means, to conformity with the output of said thermal switch means and the motor temperature predicted by said temperature prediction means.

3. A power steering apparatus with an electric motor for an automobile, comprising:
   current detection means for detecting a load current flowing in said electric motor;
   temperature characteristic memory means for storing plural temperature characteristics each representative of the relationship between the load current flowing in said electric motor and a temperature variation caused per unit time in said electric motor by such load current, said temperature characteristics being stored for different motor temperatures;
   temperature variation rate detection means for calculating the motor temperature variation caused per unit time in said electric motor correspondingly to the load current detected by said current detection means, from the temperature characteristic which is selected from the plural temperature characteristics stored in said memory means and corresponds to a predicted present motor temperature in said electric motor;
   temperature prediction means for predicting the present motor temperature by integrating past motor temperature variations per unit time obtained by said temperature variation data detection means;
   temperature decision means for comparing the present motor temperature obtained by said temperature prediction means with a predetermined set temperature to output a decision signal indicative of a heated state or a cool state of said electric motor; and
   motor control means for controlling said electric motor in accordance with the decision signal outputted from said temperature decision means.

4. A power steering apparatus according to claim 3, further comprising:
   thermal switch means retained in contact with an outer housing of said electric motor and having hysteresis characteristic to temperature with a capability of outputting binary signals representative of a high temperature state and a low temperature state; and
   temperature correction means for correctively resetting the present motor temperature predicted by said temperature prediction means, in conformity with the output of said thermal switch means and the motor temperature predicted by said temperature prediction means.

5. A power steering apparatus according to claim 4, wherein, when the output of said thermal switch means represents the high temperature state in case the predicted motor temperature is lower than a predetermined temperature which is not indicative of the heated state, said temperature correction means correctively resets the predicted motor temperature to an upper limit temperature indicative of arrival at the heated state.

6. A power steering apparatus according to claim 4, wherein, when the output of said thermal switch means represents the low temperature state in case the predicted motor temperature is lower than a predetermined temperature indicative of the cool state, said temperature correction means correctively resets the predicted motor temperature to a lower limit temperature indicative of arrival at the cool state.

7. A power steering apparatus with an electric motor for an automobile, comprising:
   current detection means for detecting a load current flowing in said electric motor;
   temperature characteristic memory means for storing plural temperature characteristics each representative of the relationship between the load current flowing in said electric motor and a temperature variation caused per unit time in said electric motor by such load current, said temperature characteristics being stored for plural differences between the temperature in said electric motor and an ambient temperature in the vicinity of said electric motor;

temperature variation rate detection means for calculating the motor temperature variation caused per unit time in said electric motor correspondingly to the load current detected by said current detection means, from the temperature characteristic which is selected from the plural temperature characteristics stored in said memory means and corresponds to the difference between a predicted present temperature in said electric motor and the ambient temperature;

temperature prediction means for predicting the present motor temperature by integrating past motor temperature variations per unit time obtained by said temperature variation rate detection means;

temperature decision means for comparing the present motor temperature obtained by said temperature prediction means with a predetermined set temperature to output a decision signal indicative of a heated state or cool state of said electric motor; and motor control means for controlling said electric motor in accordance with the decision signal outputted from said temperature decision means.

8. A power steering apparatus according to claim 7, further comprising:

thermal switch means retained in contact with an outer housing of said electric motor and having hysteresis characteristic to temperature with a capability of outputting binary signals representative of a high temperature state and a low temperature state; and temperature correction means for correctively resetting the present motor temperature predicted by said temperature prediction means, in conformity with the output of said thermal switch means and the motor temperature predicted by said temperature prediction means.

* * * * *